Patented Nov. 18, 1924.

1,516,140

UNITED STATES PATENT OFFICE.

ROBERT S. BLACK, OF HIGHLAND PARK, ILLINOIS, ASSIGNOR TO SPECIAL CHEMICALS COMPANY, OF HIGHLAND PARK, ILLINOIS, A CORPORATION OF ILLINOIS.

COMPOSITION FOR DENTAL USE.

No Drawing.   Application filed August 16, 1923. Serial No. 657,793.

*To all whom it may concern:*

Be it known that I, ROBERT S. BLACK, a citizen of the United States, residing at Highland Park, in the county of Lake and State of Illinois, have invented a new and useful Improvement in Compositions for Dental Use, of which the following is a specification.

This invention relates to compositions for dental use and more particularly to be employed in breaking down the calcified débris in tooth cavities, for the removal of calculus and for treatment of pyorrhea pockets.

In the present invention I employ a substance of the character of the anhydride of a weak organic hydroxy acid and capable, in the presence of an ionizing medium, such as water, of forming the corresponding acid to an extent determined by the equilibrium relation between the concentrations of the anhydride and acid in solution. In the specification hereinafter, such substances are designated as "potential acids".

I have found that a potential acid of this character may be incorporated into a non-ionizing anhydrous vehicle, preferably of a plastic or semi-solid consistency, such as petrolatum, and that the resulting mass, when packed into a tooth cavity, pyorrhea pocket or the like, appears to be subjected to a gradual infiltration of the aqueous liquids of the mouth, with a resulting gradual conversion of the potentional acid into its corresponding acid, the rate of this conversion being that determined by the equilibrium ratio between the potential acid and the corresponding acid. The composition, under these conditions, maintains a substantially constant concentration of acid, which may be suitably between $pH2$ and $pH5$ and rapidly breaks down the calcified débris in tooth cavities and removes the calculus and débris in pyorrhea pockets.

I have further found that the infiltration of the aqueous liquids of the mouth is accelerated by incorporating with the vehicle and the potential acid an inert, finely-subdivided non-reactive solid, such as bismuth subnitrate, tricalcium phosphate or the like.

I prefer to employ as the potential acid the lactone of a sugar acid, such as mannonic, gulonic or galactonic lactone. The proportion of the lactone present may vary from 5 to 25%. When a finely powdered compatible substance, preferably bismuth subnitrate, is incorporated in the mixture, it may be employed in amounts varying from 25 to 50%. In incorporating bismuth subnitrate, it has been found advantageous to wet it with a small amount of alcohol, say 1 to 5%, prior to incorporating it into the mixture. The alcohol so incorporated appears to have a beneficial effect in cutting or partially dissolving fats and fatty tissues present in tooth cavities and pockets.

I claim:

1. A composition for dental use as a pack comprising from 5 to 25% of a potential acid incorporated in a non-ionizing anhydrous semi-solid vehicle.

2. A composition for dental use as a pack comprising from 5 to 25% of a sugar acid lactone incorporated in petrolatum.

3. A composition for dental use as a pack comprising a sugar acid lactone and a compatible finely divided solid incorporated in a non-ionizing anhydrous vehicle.

4. A composition for dental use as a pack comprising from 5 to 25% of a sugar acid lactone and a compatible finely-divided solid incorporated into petrolatum.

5. A composition for dental use as a pack comprising 10% of galactonic lactone and 35 to 45% of bismuth subnitrate incorporated into petrolatum.

6. A composition for dental use as a pack comprising 10% of galactonic lactone and 35 to 45% of bismuth subnitrate (previously admixed with alcohol), incorporated in petrolatum.

ROBERT S. BLACK.